United States Patent [19]
Jarret et al.

[11] 3,817,506
[45] June 18, 1974

[54] APPARATUS INVOLVING THE HYDROSTATIC COMPRESSION OF AN ELASTOMER

[75] Inventors: Jean M. Jarret, Fourqueux; Jacques H. Jarret, Chatou, both of France

[73] Assignee: Societe d'Exploitation des Ressorts Auto Amortisseurs, Paris, France

[22] Filed: Aug. 8, 1973

[21] Appl. No.: 386,490

[30] Foreign Application Priority Data
Aug. 23, 1972 France .............................. 72.30088

[52] U.S. Cl. ................... 267/63 R, 267/3, 267/134, 213/40 R, 213/75 R
[51] Int. Cl. ......................... B60g 11/22, F16f 3/08
[58] Field of Search ........... 213/40 R, 44, 45, 75 R, 213/221, 217, 43, 40 D, 40 S; 267/63 R, 134, 152, 85, 3, 21 R

[56] References Cited
UNITED STATES PATENTS
2,767,859  10/1956  Fillon ............................ 267/63 R X
3,434,708  3/1969  Hawk ............................. 213/40 R X
3,658,314  4/1972  Luzsicza ........................ 267/152 X
3,741,560  6/1973  Schaller ............................ 267/134

FOREIGN PATENTS OR APPLICATIONS
1,363,297  5/1964  France ............................... 267/152

*Primary Examiner*—Robert S. Ward, Jr.
*Attorney, Agent, or Firm*—Marn & Jangarathis

[57] ABSTRACT

The invention is concerned with apparatus involving the hydrostatic compression of an elastomer. The apparatus has a first mass of precompressed elastomer in a first enclosure in which a first piston is slidably mounted. The first piston defines a second enclosure for a second mass of precompressed elastomer in which a second piston is slidably mounted. The second mass of elastomer is under a considerably higher pressure than the first mass of elastomer. Apparatus in accordance with the invention can be used in railway couplings.

1 Claim, 1 Drawing Figure

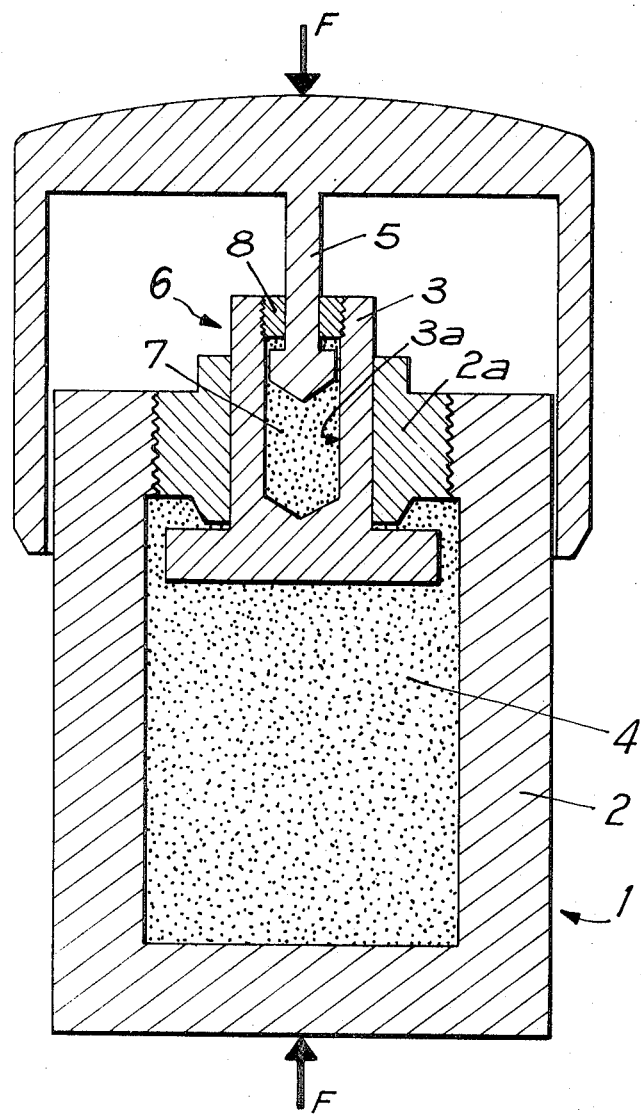

APPARATUS INVOLVING THE HYDROSTATIC COMPRESSION OF AN ELASTOMER

This invention relates to resilient apparatus using hydrostatic compression of an elastomer to obtain resilience, for example a high-energy absorbing spring.

Such apparatus has hitherto been proposed, the apparatus consisting of a plunger movable in a precompressed mass of elastomer in an enclosure. It is capable of damping very large forces and absorbing a large quantity of energy by hydrostatic compression of the elastomer. It has been observed that the degree of precompression of the elastomer in such apparatus depends on a large number of factors, in particular on temperature. This results in large deviations in the minimum force that has to be applied to the apparatus to cause it to act resiliently. The extent to which this force can vary is a disadvantage of this hitherto proposed apparatus.

According to the present invention there is provided resilient apparatus involving the comprising a first mass of precompressed elastomer in a first enclosure, the first enclosure having a casing with a first plunger slidable therein, the first plunger defining a second casing containing a second mass of precompressed elastomer, the second casing having a second plunger slidable therein and defining a second enclosure which is smaller than the first enclosure and in which the second mass of elastomer is under a higher pressure than the first mass of elastomer.

Further according to the invention there is provided apparatus for absorbing energy comprising a first chamber containing a first mass of elastomer under a first pressure, and a first plunger slidable within the first chamber, the first plunger defining a second chamber smaller than the first chamber containing a second mass of elastomer under a second pressure which is higher than the first pressure, the second chamber containing a second plunger slidable therein.

One embodiment of the present invention will now be described, by way of example, with reference to the accompanying diagrammatic drawing which shows a longitudinal section through the embodiment.

The drawing shows a first enclosure 1 having a casing 2 and a first plunger 3, the enclosure 1 being filled with a mass of elastomer 4. The plunger 3 is slidable in the casing 2 through a screw-threaded ring 2a screwed into the casing 2. The plunger 3 has an internal chamber 3a, and plunger 3 together with a second plunger 5 form a second enclosure 6. The volume of enclosure 6 is very much less than that of enclosure 1. A second mass of elastomer 7 is in enclosure 6. The plunger 5 is slidable in a ring 8 screwed into the plunger 3.

The masses of elastomer 4 and 7 in the enclosures 1 and 6 respectively are under compression when the apparatus is not in operation. The compression of mass 7 is very much greater than that of mass 4.

In use, the apparatus is subjected to a force F applied between its ends indicated in the drawing. When the force is applied hydrostatic compression of the masses of elastomer 4 and 7 occurs, the mass 7 being compressed first. Initially plunger 5 moves further into chamber 3a in the plunger 3, thereby compressing elastomer 7. When the pressure in enclosure 6 becomes so large that the force applied by this enclosure to the plunger 3 can overcome the resistance to advance of this plunger offered by the mass of elastomer 4, the plunger 3 moves further into enclosure 1. The result is an elastomer-containing hydrostatic compression spring capable of reacting to relatively weak forces through enclosure 6, and to stronger forces by means of enclosure 6 followed by enclosure 1.

One advantage of the above-described embodiment is that it enables the minimum force necessary for operation of the apparatus to be determined more precisely than with a single enclosure.

The initial pressure of the elastomer in the apparatus when not in use can still vary to a considerable extent as a result of numerous factors, in particular temperature. In use this is reflected in a considerable variation in the minimum force which has to be applied to the apparatus to make it function as a spring and an absorber of energy. However, the second enclosure 6, which has smaller dimensions than the first enclosure 3, and is filled with a highly precompressed mass of elastomer 7, enables the minimum force required to move the plunger 5 further into the enclosure 6 to be arranged to be approximately that required for the apparatus as a whole. The effect of factors such as temperature on the pressure in enclosure 6 when the apparatus is not in operation is relatively the same as the effect on the pressure in enclosure 1. However, because of the relatively small size of enclosure 6 compared with enclosure 1, variations in the minimum force required to compress the apparatus from the desired minimum are smaller in absolute terms than the variations in the minimum force that has to be applied to the mass of elastomer 4.

In practice, this enables satisfactory behaviour of the apparatus to be achieved under a wide variety of conditions and it makes it possible to comply with certain regulations and standards.

Apparatus in accordance with the invention can be used, for example in railway couplings.

We claim:
1. Resilient apparatus comprising
   a first enclosure;
   a first mass of elastomer within the first enclosure under a first pressure;
   a first plunger slidable in the first enclosure;
   a second enclosure defined by the first plunger, the second enclosure being very much smaller than the first enclosure;
   a second mass of elastomer within the second enclosure under a second pressure very much higher than said first pressure; and
   a second plunger slidable in the second enclosure.

* * * * *